United States Patent
Wu

(10) Patent No.: US 12,461,395 B2
(45) Date of Patent: Nov. 4, 2025

(54) POLARIZATION BEAM SPLITTER USING ASYMMETRIC POWER SPLITTING AND MULTIPATH INTERFEROMETRY

(71) Applicant: X Development LLC, Mountain View, CA (US)

(72) Inventor: Yi-Kuei Ryan Wu, San Jose, CA (US)

(73) Assignee: X Development LLC, Mountain View, CA (US)

( * ) Notice: Subject to any disclaimer, the term of this patent is extended or adjusted under 35 U.S.C. 154(b) by 288 days.

(21) Appl. No.: 18/375,717

(22) Filed: Oct. 2, 2023

(65) Prior Publication Data

US 2025/0110358 A1    Apr. 3, 2025

(51) Int. Cl.
G02F 1/01    (2006.01)
G02B 27/00    (2006.01)
G02F 1/21    (2006.01)

(52) U.S. Cl.
CPC ....... *G02F 1/0144* (2021.01); *G02B 27/0012* (2013.01); *G02F 1/217* (2021.01)

(58) Field of Classification Search
None
See application file for complete search history.

(56) References Cited

U.S. PATENT DOCUMENTS

| | | | |
|---|---|---|---|
| 10,677,987 B1 | 6/2020 | Dumais | |
| 11,187,854 B2 | 11/2021 | Schubert et al. | |
| 2002/0044318 A1* | 4/2002 | Hung | H04J 14/0307 385/24 |
| 2005/0254751 A1 | 11/2005 | Ushiro et al. | |
| 2008/0112679 A1* | 5/2008 | Noda | B82Y 20/00 385/129 |

(Continued)

FOREIGN PATENT DOCUMENTS

| CN | 113167971 A | 7/2021 |
|---|---|---|
| CN | 115685443 A | 2/2023 |
| KR | 10-2018-0114559 A | 10/2018 |

OTHER PUBLICATIONS

Melikyan et al., 'Adiabatic mode converters for silicon photonics: Power and polarization broadband manipulators,' APL Photonics 4, 030803 (2019); https://doi.org/10.1063/1.5080247, 10 pages.

(Continued)

*Primary Examiner* — Chris H Chu
(74) *Attorney, Agent, or Firm* — Christensen O'Connor Johnson Kindness PLLC

(57) ABSTRACT

A polarization beam splitter includes an input port, first and second output ports, and a polarization splitting region coupled between the input port and the first and second output ports. The input port is adapted to receive guided optical signals that are polarization multiplexed, including a transverse electric (TE) optical signal and a transverse magnetic (TM) optical signal. The polarization splitting region includes a pattern of at least two materials having different refractive indexes. The pattern is shaped to demultiplex the TE and TM optical signals by directing a first power majority of the TE optical signal received at the input port to the second output port via asymmetrical power splitting while directing a second power majority of the TM optical signal received at the input port to the first output port via multipath interferometry.

20 Claims, 11 Drawing Sheets

(56) References Cited

U.S. PATENT DOCUMENTS

| | | | |
|---|---|---|---|
| 2015/0309252 A1 | 10/2015 | Kato et al. | |
| 2016/0282555 A1 | 9/2016 | Kojima et al. | |
| 2022/0373739 A1 | 11/2022 | Abril et al. | |
| 2024/0061175 A1* | 2/2024 | Srinivasan | G02B 6/132 |
| 2025/0277987 A1* | 9/2025 | Wu | G02B 27/10 |

OTHER PUBLICATIONS

Cong et al., 'A perfect metamaterial polarization rotator,' AIP, Applied Physics Letters 103, 171107 (2013), doi: 10.1063/1.4826536, View online: http://dx.doi.org/10.1063/1.4826536, 6 pages.

Sun et al., 'Compact and broadband polarization beam splitter based on a silicon nitride augmented low-index guiding structure,' Optics Letters, vol. 41, No. 1, Jan. 1, 2016, pp. 163-166.

Yilmaz et al., 'Inverse design of efficient and compact 1 × N wavelength demultiplexer', Elsevier, Optics Communications, 454 (2020), 7 pages.

Yang et al., 'Inverse-designed multi-dimensional silicon photonic transmitters,' arXiv:2103.14139v2 [physics.app-ph] Oct. 11, 2021, 19 pages.

Kanesaka et al., 'Proposal of compact multimode interference optical modulator with high extinction ratio,' 2022 The Japan Society of Applied Physics, Japanese Journal of Applied Physics 61, SK1018 (2022) 8 pages.

Loughridge et al. 'A Tutorial on Laser Interferometry for Precision Measurements,' Conference Paper in Proceedings of the American Control Conference, Jun. 2013, DOI: 10.1109/ACC.2013.6580402, pp. 3692-3709.

Sacher et al., 'Polarization rotator-splitters in standard active silicon photonics platforms,' Optical Society of America, Feb. 24, 2014 | vol. 22, No. 4 | DOI:10.1364/OE.22.003777 | Optics Express pp. 3777-3786.

Wang et al., 'Proposal for fabrication-tolerant SOI polarization splitter-rotator based on cascaded MMI couplers and an assisted bi-level taper,' Nov. 17, 2014 | vol. 22, No. 23 | DOI:10.1364/OE.22.027869 | Optics Express pp. 27869-27879.

Ma et al., 'Symmetrical polarization splitter/rotator design and application in a polarization insensitive WDM receiver,' Jun. 15, 2015 | vol. 23, No. 12 | DOI: 10.1364/OE.23.016052 | Optics Express pp. 16052-16062.

Lu et al., 'Wideband silicon photonic polarization beamsplitter based on point-symmetric cascaded broadband couplers,' Nov. 16, 2015 | vol. 23, No. 23 | DOI: 10.1364=OE.22.029413 | Optics Express pp. 29413-29422.

International Search Report and Written Opinion mailed Dec. 19, 2024, in corresponding PCT Application No. PCT/2024/047469, 6 pages.

TW Office Action issued from the Intellectual Property Office on May 29, 2025, in corresponding ROC (Taiwan) Pat. Application No. 113137488, 5 pages.

\* cited by examiner

POLARIZATION BEAM SPLITTER USING ASYMMETRIC POWER SPLITTING AND MULTIPATH INTERFEROMETRY

TECHNICAL FIELD

This disclosure relates generally to photonic devices, and in particular but not exclusively, relates to polarization beam splitters.

BACKGROUND INFORMATION

Artificial intelligence (AI) and machine learning (ML) applications are expected to place high demands on the data bandwidth of future XPUs (e.g., central processing units, graphic processing units, tensor processing units, etc.). In fact, data bandwidth is expected to be the bottleneck for future XPU development. In particular, board-to-board and chip-to-chip interconnects will need to support ever increasing bandwidths. Optical interconnects promise to satisfy this increasing bandwidth need. However, despite the high bandwidth provided by optical interconnects, conventional designs suffer from low data bandwidth density (i.e., data bandwidth per unit area). To improve the data bandwidth density of optical interconnects, photonic integrated circuits need to be reduced in physical size.

A polarization beam splitter (PBS) is a fundamental building block for high speed optical interconnects as they enable polarization multiplexing. A PBS is an optical filter that splits an incident beam into two separate beams of different polarizations. In the ideal scenario, these separate beams are fully polarized with orthogonal polarizations. In the context of guided light (e.g., optic fibers), the incident light may include transverse electric (TE) and transverse magnetic (TM) polarizations and in the context of single mode waveguides (e.g., single mode optic fibers), the light may include just the fundamental spatial modes TE0 and TM0 for the respective polarizations. The TE0 and TM0 signals can increase the bandwidth of guided light by encoding distinct data channels on the orthogonal polarization modes TE0 and TM0.

Conventional PBS have physical sizes on the order of 100 µm×8 µm. A PBS that is able to substantially reduce these physical dimensions while maintaining expected functional characteristics (e.g., polarization crosstalk & isolation, insertion/transmission loss, back reflection, etc.) will help satisfy the higher data bandwidth density demands expected from future XPU development.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation of a polarization beam splitter (PBS) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the PBS described herein are inspired by inverse design to implement a PBS that can achieve similar performance in terms of transmission loss, back reflections, and crosstalk isolation (referred to as target performance goals) but in a package that is substantially smaller than conventional designs. For example, in various embodiments, a polarization splitting region of the PBS described herein may be implemented within a 7 µm×8 µm footprint while achieving target performance goals of: transmission loss<−1 dB, back reflection loss<−30 dB, polarization crosstalk loss<−20 dB). Furthermore, the PBS may be integrated with other optoelectronic circuits as part of a photonic integrated circuit (PIC) that is produced using established semiconductor photolithography techniques using silicon and silicon dioxide. Of course, other materials and fabrication techniques may be used as well.

Figure 1:
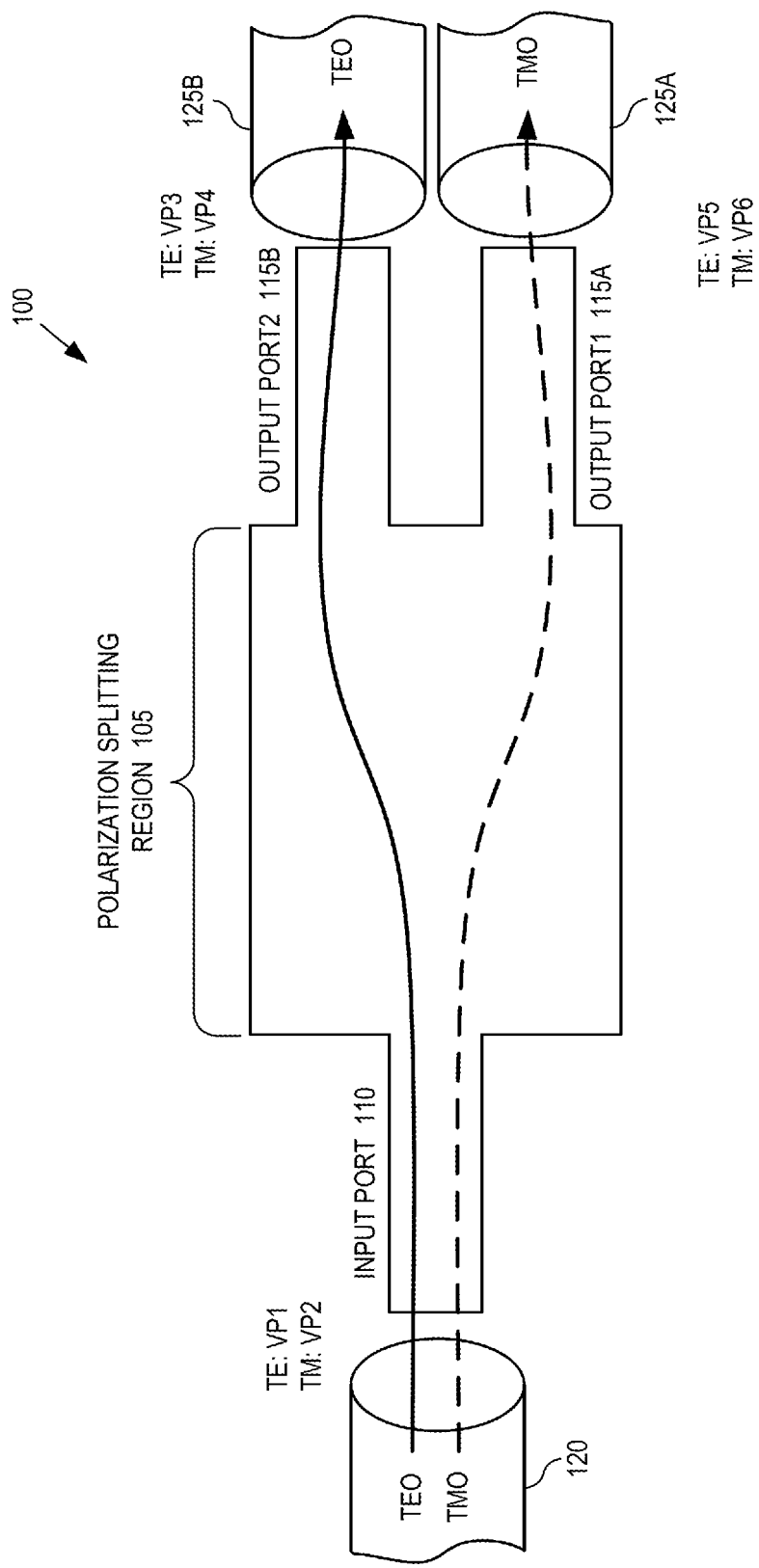
FIG. 1 is a functional block diagram illustrating a polarization beam splitter (PBS), in accordance with an embodiment of the disclosure.

FIG. 1 is a functional block diagram illustrating a PBS 100, in accordance with an embodiment of the disclosure. The illustrated embodiment of PBS 100 includes a polarization splitting region 105, an input port 110, and output port1 115A and output port2 115B (collectively referred to as "output ports 115").

Although PBS 100 is described in connection with its polarization splitting function (polarization demultiplexing), it should be appreciated that light propagating in the reverse direction along output ports 115 to input port 110 will be combined (polarization multiplexed) and thus PBS 105 may also be referred to as a polarization beam combiner or polarization multiplexer when operated in the reverse direction due to optical reciprocity. Thus a polarization beam splitter (PBS) and polarization beam combiner (PBC) may be the same physical photonic device, but merely referring to the forward or reverse flow of light through the photonic device. Similarly, the designation of a given port as an "input" port vs an "output" port is merely in reference to the directional flow of optical signals through a PBS, but these designations may be reversed when referring to a PBC.

Returning to FIG. 1, input port 110 operates as an interface between polarization splitting region 105 and waveguide 120 while output ports 115 operate as interfaces between polarization splitting region 105 and waveguides 125A and 125B. Guided optical signals received from waveguide 120 are demultiplexed into distinct optical signals output from output ports 115 onto waveguides 125A and B. The guided optical signals are polarization multiplexed signals while the demultiplexed signals output from output ports 115 are single polarization optical signals. In the illustrated embodiment, waveguide 120 (e.g., single mode optic fiber) carries transfer electric (TE) and transverse magnetic (TM) optical signals. These TE and TM optical signals may be encoded on a common carrier wavelength (e.g., 1280 nm to 1350 nm), or in some embodiments, encoded on distinct carrier wavelengths. In the illustrated embodiments, the TE and TM optical signals are fundamental spatial modes (e.g., TE0 and TM0) of a single mode optic fiber. Each signal TE0 and TM0 may encode distinct communication channels, thereby increasing the bandwidth of waveguide 120. PBS 100 operates to demultiplex these distinct communication channels by physically separating the TM optical signal from the TE optical signal onto output ports 115A and 115B, respectively.

Figure 2:
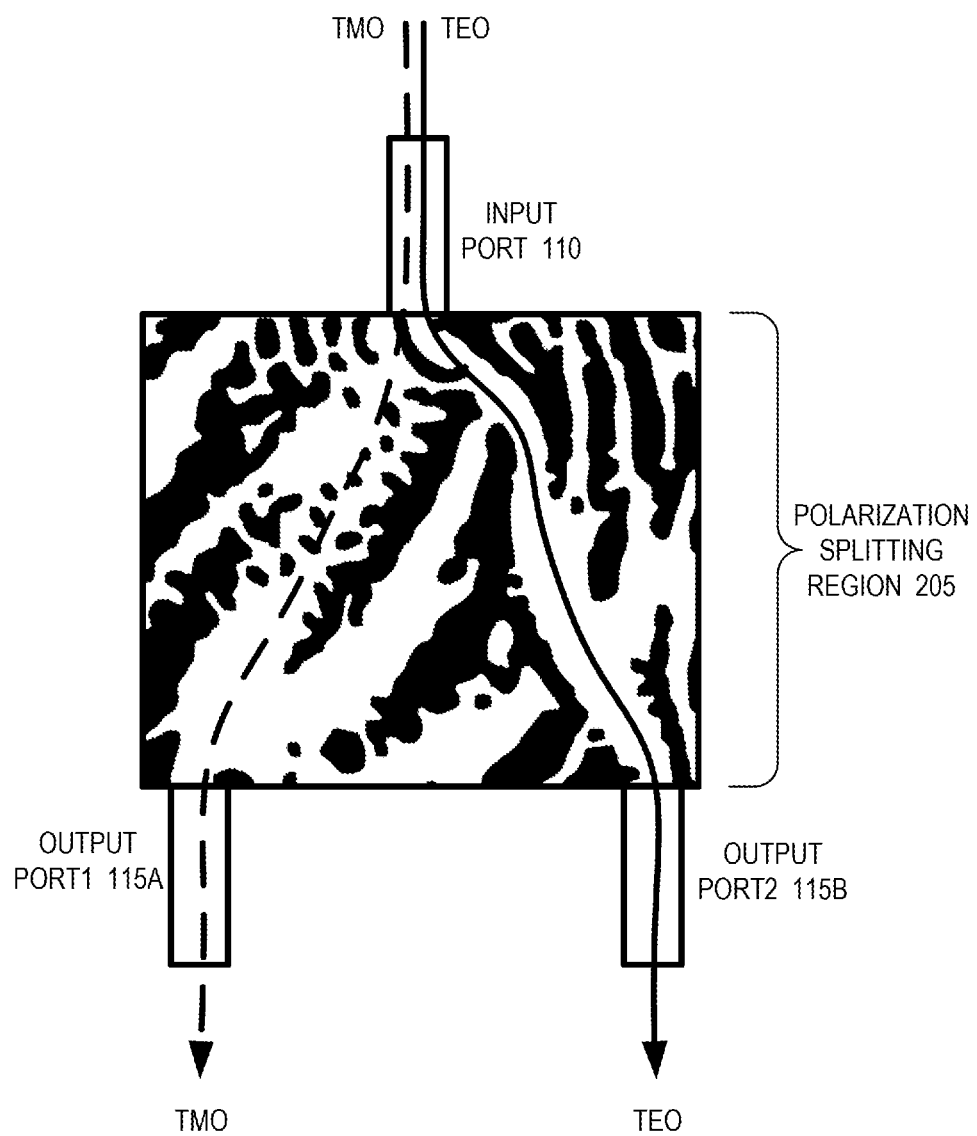
FIG. 2 illustrates details of a PBS having an inverse designed polarization splitting region, in accordance with an embodiment of the disclosure.

FIG. 2 illustrates a PBS 200 having a polarization splitting region inspired by inverse design, in accordance with an embodiment of the disclosure. PBS 200 is one possible implementation of PBS 100 illustrated in FIG. 1. In particular, FIG. 2 illustrates details of polarization splitting region 205. The illustrated embodiment of polarization splitting region 205 includes a pattern of at least two materials (e.g., silicon and silicon dioxide) having different refractive indexes. The pattern is shaped to demultiplex the TE optical signals (e.g., TE0) and the TM optical signals (e.g., TM0) received at input port 110. The pattern within polarization splitting region 205 is shaped to direct a majority of the power of the TE optical signal receive at input port 110 to output port2 115B. The selective directing of the TE optical signal to output port2 115B is achieved via an asymmetrical power splitting that sends a majority of the TE power to output port2 115B. Correspondingly, this pattern of polarization splitting region 205 is also shaped to direct a majority of the power of the TM optical signal received at input port 110 to output port1 115A. The selective directing of the TM optical signal to output port1 115A is achieved via multipath interferometry that sends a majority of the TM power to output port1 115A.

In one embodiment, polarization splitting region 205 is a planar waveguide having the illustrated pattern disposed within the planar waveguide as a two-dimensional (2D) pattern. Of course, in other embodiments, a three-dimensional (3D) pattern may also be implemented. In the illustrated embodiment, the 2D pattern is defined using two materials having distinct refractive indexes (e.g., silicon and silicon dioxide). The pattern is an irregular pattern. For example, at the macro-level, the irregular pattern is not formed by regular geometric shapes such as triangles, rectangles, pentagons, hexagons, octagons, etc. Rather, the pattern is an organic pattern that resembles channels, inlets, and islands of a natural coastline. Of course, at the micro-level, the pattern may be formed by pixelated deposits of the two or more materials, which individual pixels may comprise a geometric shape. The feature size and shape of the individual material pixels is dependent upon the fabrication process, but the overall pattern does not resemble a simple, regular geometric shape such as a triangle, rectangle, or other low order polygon (e.g., 10 sides or less).

Figure 3B:
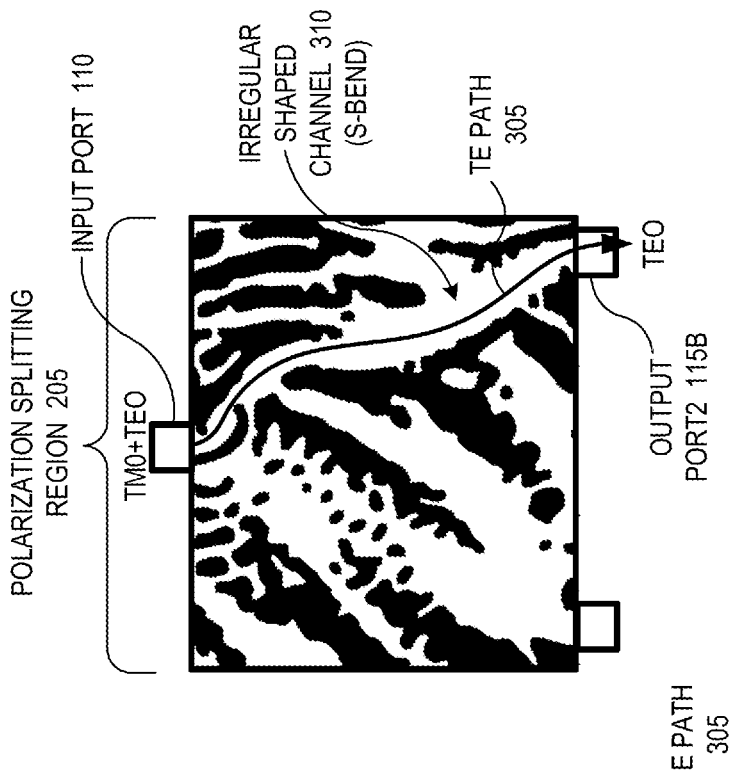
FIGS. 3A and 3B illustrate a transverse electric (TE) path through the polarization splitting region that directs a majority of the power of a TE optical signal to an output port2 of the PBS via asymmetrical power splitting, in accordance with an embodiment of the disclosure.
Figure 3A:
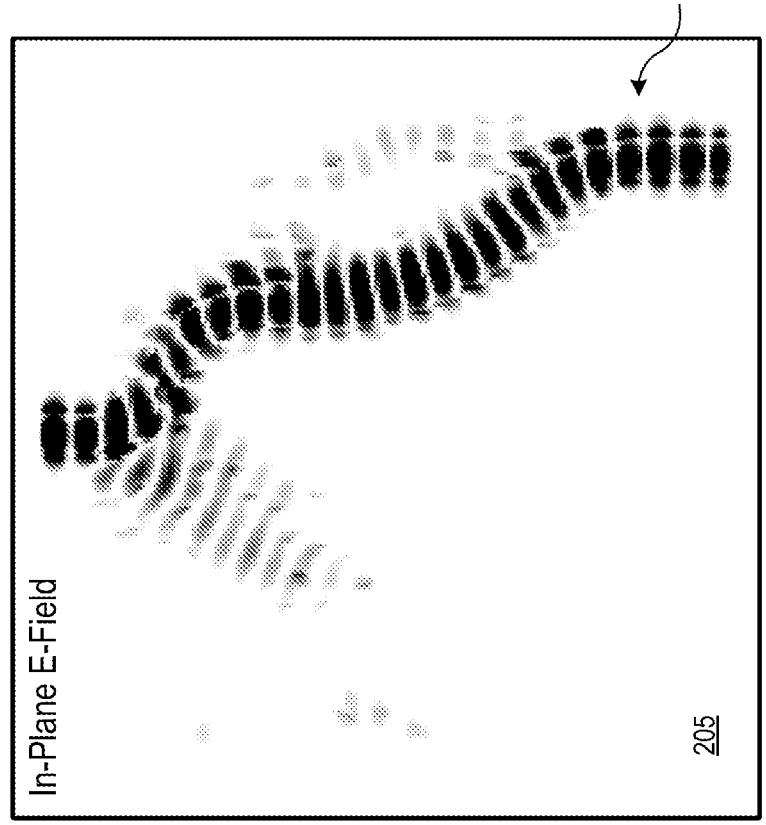
Figures 4A, 4B:
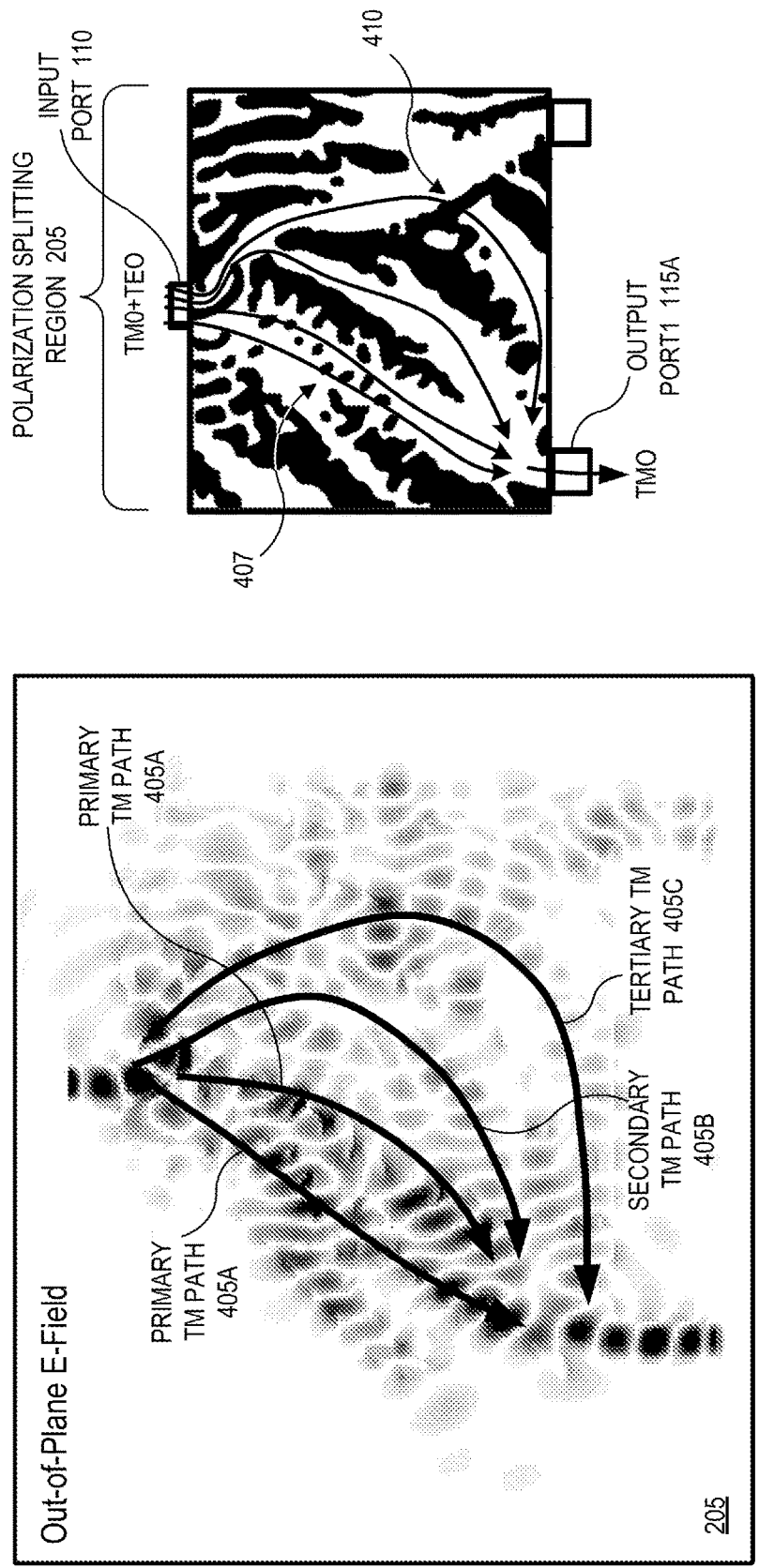
FIGS. 4A and 4B illustrate transverse magnetic (TM) paths through the polarization splitting region that direct a majority of the power of a TM optical signal to an output port1 via multipath interferometry, in accordance with an embodiment of the disclosure.

In the illustrated embodiment, the irregular shaped pattern includes a number of pattern features (i.e., irregularly shaped features) that facilitate the asymmetrical power splitting of the TE optical signal along with the simultaneous multipath interferometry of the TM optical signal. FIGS. 3A, 3B, 4A, and 4B illustrate these pattern features. In particular, FIGS. 3A and 3B illustrate a TE path 305 through polarization splitting region 205 that directs a majority of the power of the TE optical signal to output port2 115B via asymmetrical power splitting. Correspondingly, FIGS. 4A and 4B illustrate TM paths 405A-C through polarization splitting region 205 that direct a majority of the power of the TM optical signal to output port1 115A via multipath interferometry.

Referring to FIG. 3B, TE path 305 extends from input port 110 to output port2 115B along an irregular shaped channel 310. Irregular shaped channel 310 is formed of the high index material, such as silicon (illustrated as white), surrounded by the low index material, such as silicon dioxide (illustrated as black). In the illustrated embodiment, irregular shaped channel 310 includes an S-bend shape that is not obstructed between input port 110 and output port2 115B by the low index material. In other words, the irregular shaped channel 310 forms a continuous, unobstructed, pathway that is forms a mild circuitous S-bend shape between the ports. Irregular shaped channel 310 facilitates the asymmetrical power splitting that guides a majority of the optical power in the TE optical signal from input port 110 to output port2 115B. FIG. 3A is a power density heat map illustrating the power density of the TE optical signal (in-plane E-field) through polarization splitting region 205. As illustrated, a strong majority of the optical power in the TE optical signal is guided along irregular shaped channel 310 along TE path 305 and reaches output port2 115B.

Referring to FIGS. 4A and 4B, TM paths 405A-C (collectively referred to as TM paths 405) extend from input port 110 to output port1 115A along multiple interferometry paths. TM paths 405A-C are also defined by the high index material, such as silicon (illustrated as white), surrounded by the low index material, such as silicon dioxide (illustrated as black). The primary TM path 405A is composed of two sub-paths that weave around and through a number of scattering locations. In other words, primary TM path 405A includes a plurality of scattering location 407 formed from islands of low index material disposed within the high index material. The secondary TM path 405B takes an unobstructed circuitous path through the high index material. The tertiary TM path 405C takes an even less direct path through the high index material (partially along irregular shaped channel 310) and is obstructed at location 410 by low index material. It is believed that evanescent coupling and/or the near normal incidence of tertiary TM path 405C to the low index material obstruction permits the components of the TM optical signal to pass through the low index material obstruction at location 410. Regardless, the multiple TM paths established by the pattern between the input port 110 and output port1 115A direct a strong majority of the optical power in just the TM optical signal from input port 110 to output port1 115A via multipath interferometry. The power density heat map of FIG. 4A illustrates the strong coupling of the TM optical signal (out-of-plane E-field) to output port1 115A.

Figure 5A:
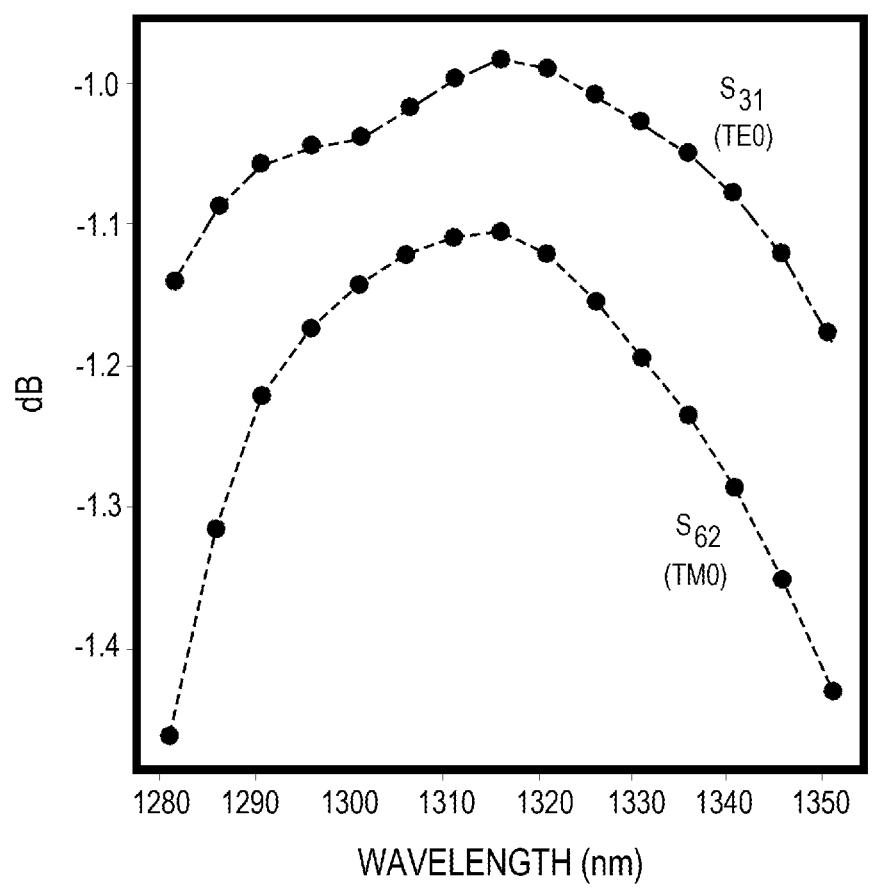
FIG. 5A is a chart illustrating transmission loss of the PBS, in accordance with an embodiment of the disclosure.
Figure 5B:
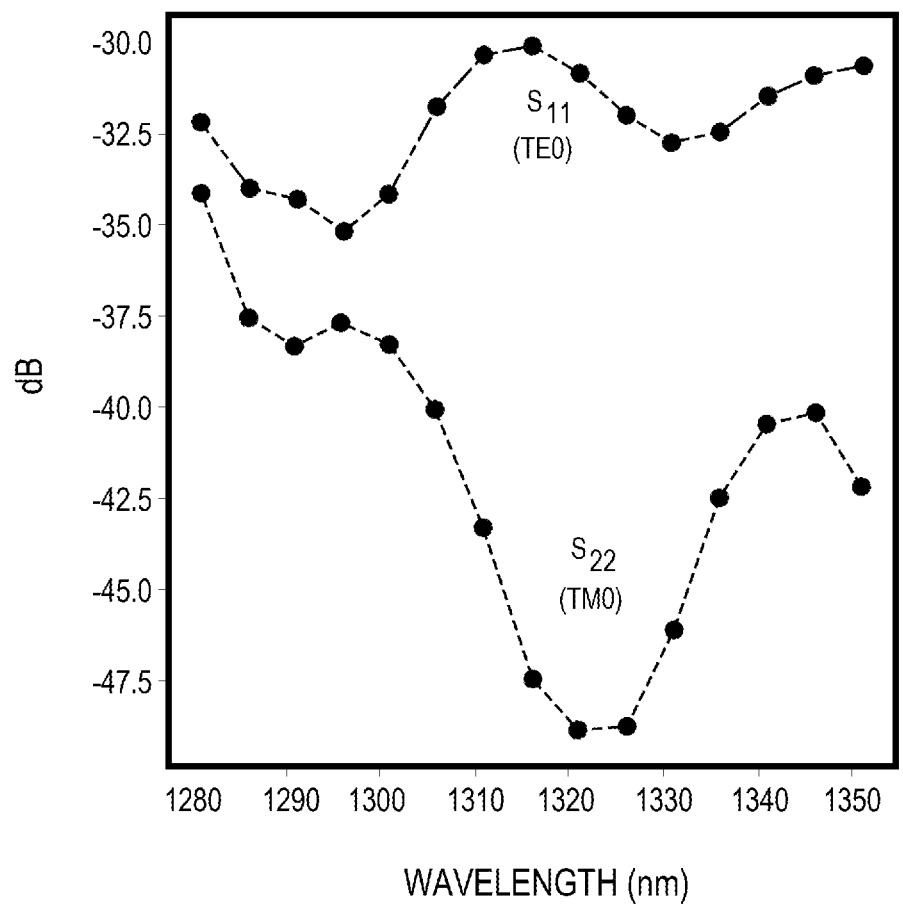
FIG. 5B is a chart illustrating back reflection loss of the PBS, in accordance with an embodiment of the disclosure.
Figure 5C:
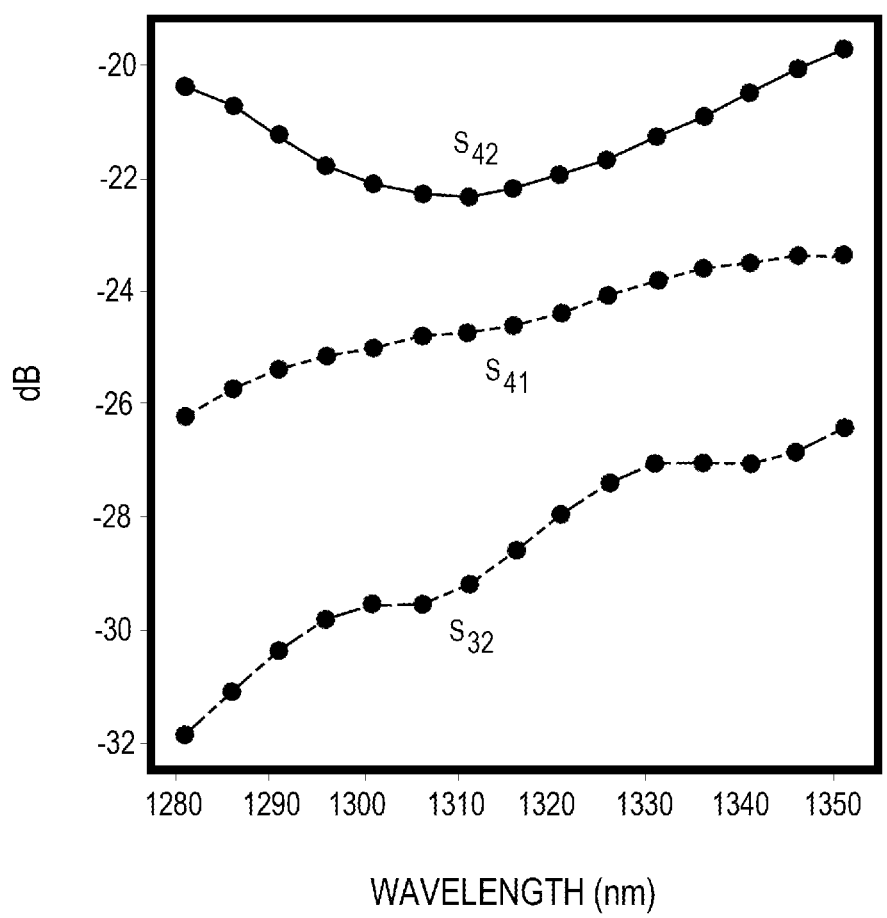
FIG. 5C is a chart illustrating crosstalk loss of the PBS, in accordance with an embodiment of the disclosure.

The high efficiency and low crosstalk characteristics of PBS 100 (or 200) are illustrated in FIGS. 5A-C. FIG. 5A illustrates transmission loss curves for PBS 100/200 over the wavelength band of interest (e.g., 1280 nm to 1350 nm). The transmission loss is characterized by the s-parameters S31 and S62. Referring to FIG. 1, the S31 s-parameter refers to the transmission/insertion loss in the optical power between virtual ports VP1 and VP3. Virtual ports VP1 and VP3 correspond to the TE0 optical signals at physical ports 110 and 115B. Correspondingly, the S62 s-parameter refers to the loss in the optical power between virtual ports VP2 and VP6. Virtual ports VP2 and VP6 correspond to the TM0 optical signals at physical ports 110 and 115A. As illustrated, the transmission loss (also known as insertion loss) remains below approximately-1 dB across the illustrated wavelength band.

FIG. 5B illustrates back reflection loss curves for PBS 100/200 over the wavelength band of interest. The back reflection loss is characterized by the s-parameters S11 and S22. Referring to FIG. 1, the S11 and S22 s-parameters refer to the back reflection loss in the optical power at virtual ports VP1 and VP2. Virtual ports VP1 and VP2 correspond to the TE0 and TM optical signals, respectively, at physical input port 110. As illustrated, the back reflection loss back out physical input port 110 remains below approximately-30 dB across the illustrated wavelength band for both the TM and TE optical signals.

FIG. 5C illustrates crosstalk (isolation) loss between the TE and TM optical signals. The crosstalk is characterized by s-parameters S32, S412, and S42 for polarization crosstalk at physical output port2 115B (illustrated). The crosstalk is further characterized by s-parameters S51, S61, S52 for polarization crosstalk at physical output port 115A (not illustrated). In the illustrated embodiment, the polarization crosstalk remains below approximately-20 dB across the wavelength band of interest. The above listed s-parameter values may be considered target values for the purposes of stating the loss function for iterative inverse design of the pattern within polarization splitting region 205.

Figure 6:
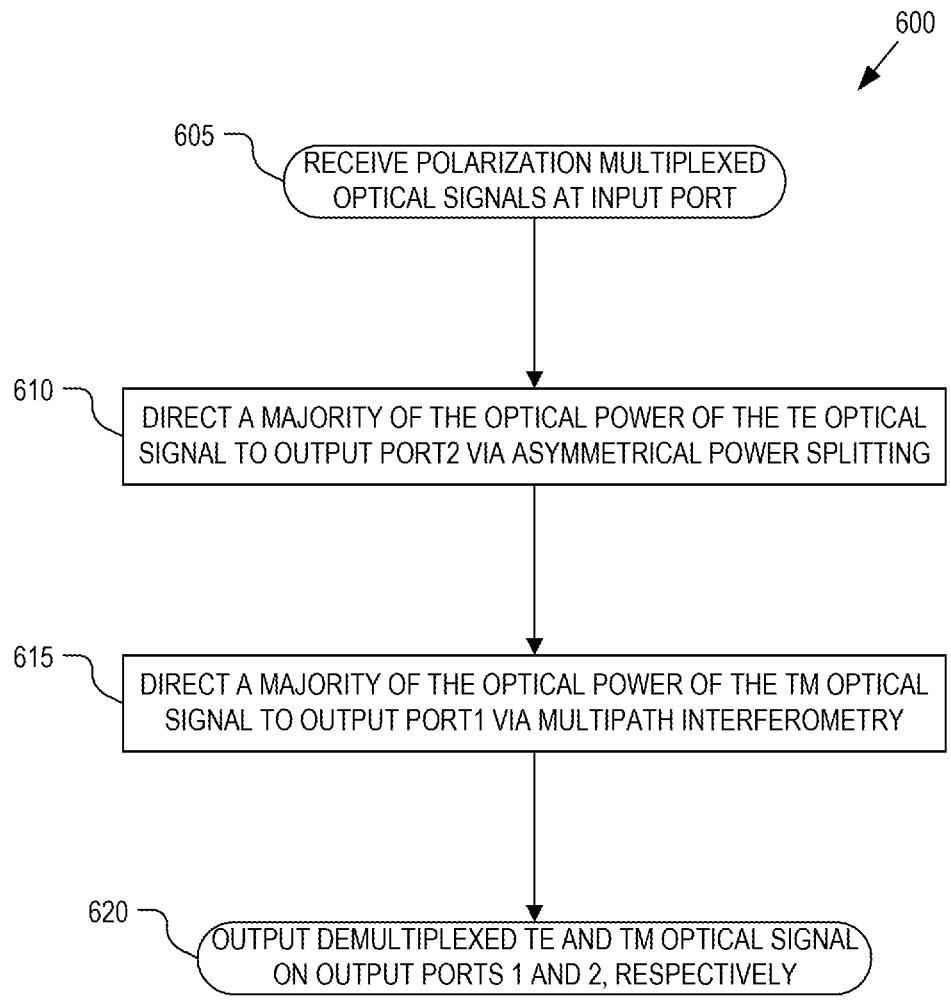
FIG. 6 is a flow chart illustrating operation of the PBS to demultiplex TE and TM optical signals, in accordance with an embodiment of the disclosure.

FIG. 6 is a flow chart illustrating a process 600 for operation of PBS 100/200 to demultiplex the TE and TM optical signals received at input port 110, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In process block 605, the polarization multiplexed optical signals are received from waveguide 120 at input port 110. These TE and TM optical signals may be the fundamental optical signals TE0 and TM0. The polarization multiplexed signals may be received simultaneously or at different times. In process block 610, the majority of the optical power (aka first power majority) in the TE optical signal is directed from input port 110 to output port1 115B via asymmetrical power splitting. In process block 615, the majority of the optical power (aka second power majority) in the TM optical signal is directed from input port 110 to output port1 115A via multipath interferometry. In process block 620, the demultiplexed TE and TM optical signals are output from output ports 115 to waveguides 125B and 125A, respectively.

As mentioned above, PBS 100/200 is inspired by inverse design. In particular, the pattern of at least two materials having differing refractive indexes may be defined by an iterative minimization of a loss function that sums a transmission loss, a reflection loss, and a crosstalk loss. The optimization objective of the inverse design methodology may be constructed as a function of the following loss function Loss (x), $$\text{Loss}(x) = \sum_\lambda \text{Transmission loss}(x, \lambda) + \qquad (\text{Eq. 1})$$
$$\sum_\lambda \text{Reflection loss}(x, \lambda) + \sum_\lambda \text{Crosstalk loss}(x, \lambda),$$

where,

Transmission loss$(x, \lambda)$ = Transmission$(x, \lambda)$ − target values 1

Reflection loss$(x, \lambda)$ = Reflection$(x, \lambda)$ − target values 2

Crosstalk loss$(x, \lambda)$ = Crosstalk$(x, \lambda)$ − target values 3.

The objective is constructed in a way that the resulting structure/pattern of polarization splitting region 205 is encouraged to guide TM optical signals to output port1 114A and TE optical signals to output port2 115B.

Inverse design operates using a design simulator (aka design model) configured with an initial design or pattern for polarization splitter region 205 to perform a forward operational simulation of the initial design (e.g., using Maxwell's equations for electromagnetics). For example, the initial design could be a random pattern of silicon and silicon dioxide. The output of the forward operational simulation is a simulated field response at output ports 115 in response to stimuli at input port 110. Specific performance parameters of this output field response may be selected as parameters of interest (e.g., power loss, wavelength, crosstalk, etc.) and are referred to as simulated performance parameters. The simulated performance parameters are used by the loss function to calculate a performance loss value, which may be a scalar value (e.g., mean square difference between simulated performance values and target performance values). The differentiable nature of the design model enables a backpropagation via an adjoint simulation of a performance loss error, which is the difference between the simulated output values and the desired/target performance values. The performance loss error is backpropagated through the design model during the adjoint simulation to generate structural gradients that represent, for example, the sensitivity of the performance loss value to changes in the structural material properties (e.g., topology or pattern of materials) of polarization splitting region 205. A program such as TensorFlow published by Google may be used to calculate the gradients. These gradients may then be used by a structural optimizer to optimize or refine the initial structural design to generate a revised structural design of polarization splitting region 205. The forward and reverse simulations may then be iterated along with the structural optimization (e.g., iterative gradient descent, stochastic gradient descent, etc.) until the performance loss value falls within acceptable design criteria (referred to as saturation) and/or for a predetermined number of iterations. The above description is merely an example inverse design technique that may be used to refine or optimize the features and topology of the pattern within polarization splitting region 205. It is appreciated that other inverse design techniques alone, or in combination with other conventional design techniques, may also be implemented.

The inverse design techniques described above may be applied to determine the specific material combinations, feature sizes, and feature arrangement (i.e., pattern) to achieve the desired polarization demultiplexing using the above loss function. Loss (x) is a function of x, where x is a vector representing the structural pattern of materials having different refractive indexes within polarization splitting region 205. In one embodiment, the target values 1, 2, and 3 correspond to the dB values listed above in connection with FIGS. 5A-C.

Figure 7A:
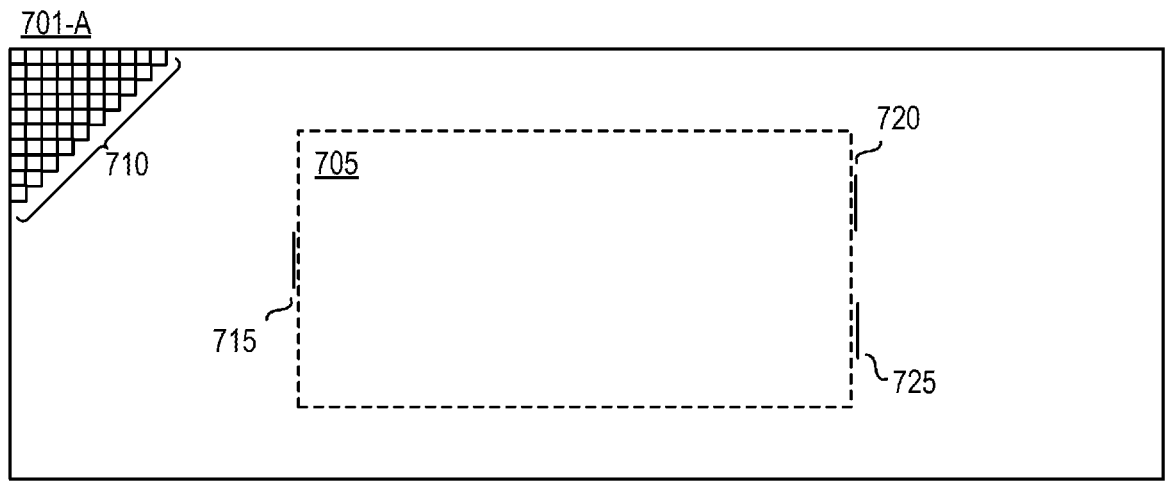
FIG. 7A illustrates a demonstrative simulated environment for simulating the operation of a PBS under design, in accordance with an embodiment of the disclosure.
Figure 7B:
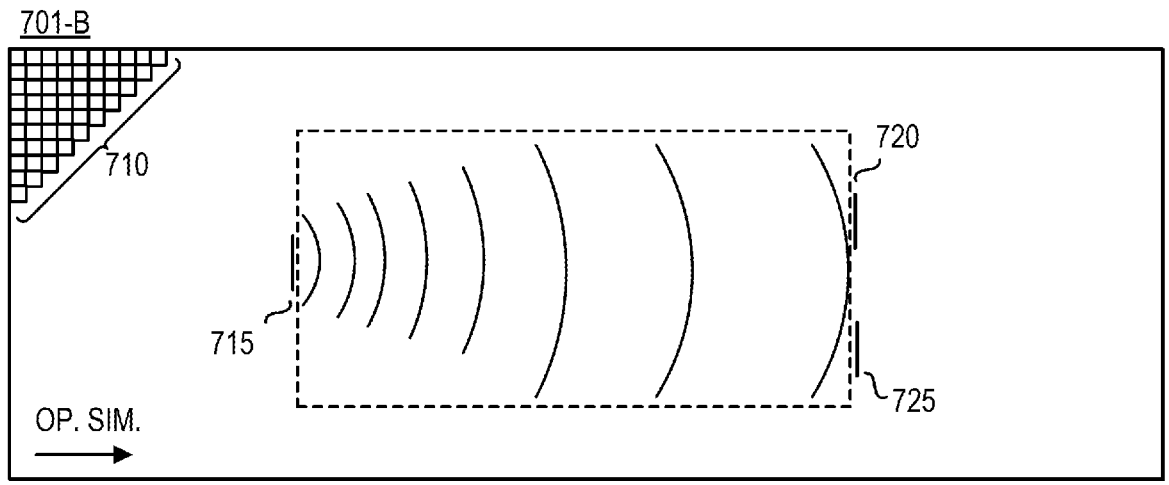
FIG. 7B illustrates an operational simulation of a PBS, in accordance with an embodiment of the disclosure.
Figure 7C:
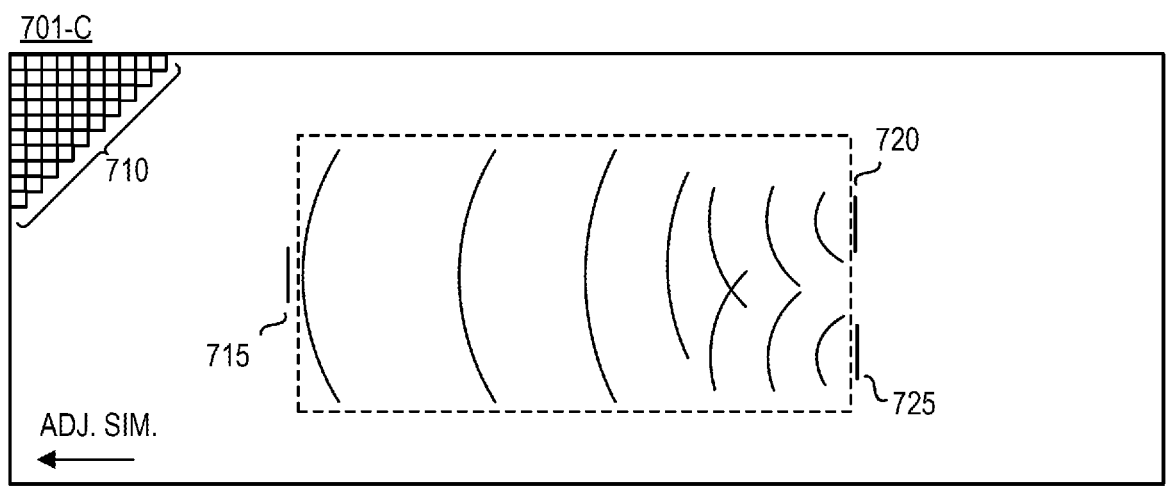
FIG. 7C illustrates an adjoint simulation (backpropagation) of a performance loss error through the simulated environment including the PBS, in accordance with an embodiment of the disclosure.

FIGS. 7A-7C illustrate an initial setup, an operational simulation, and an adjoint simulation of a simulated environment 701, respectively, for optimizing structural parameters of a physical device (e.g., PBS 100 or 200) with a design model, in accordance with an inverse design embodiment. The simulated environment 701 and corresponding initial setup, operational simulation, adjoint simulation, and structural parameter optimization may be achieved via a physics simulator using Maxwell's equations. As illustrated in FIGS. 7A-7C, the simulated environment is represented in two-dimensions, however it is appreciated that higher dimensionality (e.g., 3-dimensional space) may also be used to describe the simulated environment 701 and the physical device. In some embodiments, the optimization of the structural parameters of the physical device illustrated in FIGS. 7A-7C may be achieved via, inter alia, simulations (e.g., time-forward and backpropagation) that utilize a finite-difference time-domain (FDTD) method to model the field responses (e.g., both electric and magnetic).

FIG. 7A illustrates an example rendering of a simulated environment 701-A describing an electromagnetic device. The simulated environment 701-A represents the simulated environment 701 at an initial time step (e.g., an initial set up) for optimizing structural parameters of the physical device. The physical device described by the simulated environment 701 may correspond to PBS 100 or 200 having a designable region 705 (e.g., polarization splitting region 205) in which the structural parameters of the simulated environment may be designed, modified, or otherwise changed. The simulated environment 701 includes an excitation source 715 (e.g., a gaussian pulse, a wave, a waveguide mode response, and the like) at the location of input port 110. The electrical and magnetic fields (e.g., field response) within the simulated environment 701 may change in response to the excitation source 715. The specific settings of the initial structural parameters, excitation source, performance parameters, and other metrics (i.e., initial description) for a first-principles simulation of a physical device are input before the operational simulation starts.

As illustrated, the simulated environment 701 (and subsequently the physical device under design) is described by a plurality of voxels 710, which represent individual elements of the two-dimensional (or three-dimensional) space of the simulated environment. Each of the voxels is illustrated as two-dimensional squares, however it is appreciated that the voxels may be represented as cubes or other shapes in three-dimensional space. It is appreciated that the specific shape and dimensionality of the plurality of voxels 710 may be adjusted dependent on the simulated environment 701. It is further noted that only a portion of the plurality of voxels 710 are illustrated to avoid obscuring other aspects of the simulated environment 701. Each of the plurality of voxels 710 is associated with one or more structural parameters, a field value to describe a field response, and a source value to describe the excitation source at a specific position within the simulated environment 701. The field response, for example, may correspond to a vector describing the electric and/or magnetic field at a particular time step for each of the plurality of voxels 710. More specifically, the vector may correspond to a Yee lattice that discretizes Maxwell's equations for determining the field response. In some embodiments, the field response is based, at least in part, on the structural parameters and the excitation source 715.

FIG. 7B illustrates an example operational simulation of the simulated environment 701-B at a particular time step in which the excitation source 715 is active (e.g., generating waves originating at the excitation source 715 that propagate through the simulated environment 701). As mentioned, the physical device is an optical modulator operating at the frequency of interest and having a particular waveguide mode (e.g., transverse electromagnetic mode, transverse electric mode, etc.) and the excitation source is at an input port 110. The operational simulation occurs over a plurality of time steps. When performing the operational simulation, changes to the field response (e.g., the field value) for each of the plurality of voxels 710 are updated in response to the excitation source 715 and based, at least in part, on the structural parameters of the physical device at each of the plurality of time steps. Similarly, in some embodiments the source value is updated for each of the plurality of voxels (e.g., in response to the electromagnetic waves from the excitation source 715 propagating through the simulated environment). It is appreciated that the operational simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

When performing the operational simulation, the performance loss function, Loss (x), may be computed at each output port 720 and 725 based, at least in part, on a comparison (e.g., mean squared difference) between the field response and a desired field response at a designated time step (e.g. a final time step of the operational simulation). A performance loss value may be described in terms of a specific performance value (e.g., power). Structural parameters may be optimized for this specific performance value.

FIG. 7C illustrates an example backpropagation of performance loss error backwards within the simulated environment 701-C describing the physical device. In one embodiment, the adjoint performance simulation injects a performance loss error at output ports 720 and 725 as a sort of reverse excitation source for stimulating a reverse field response through voxels 710 of simulated environment 701-C. The adjoint performance simulation of the performance loss error determines an influence that changes in the structural parameters of voxels 710 have on the performance loss value.

Figure 8A:
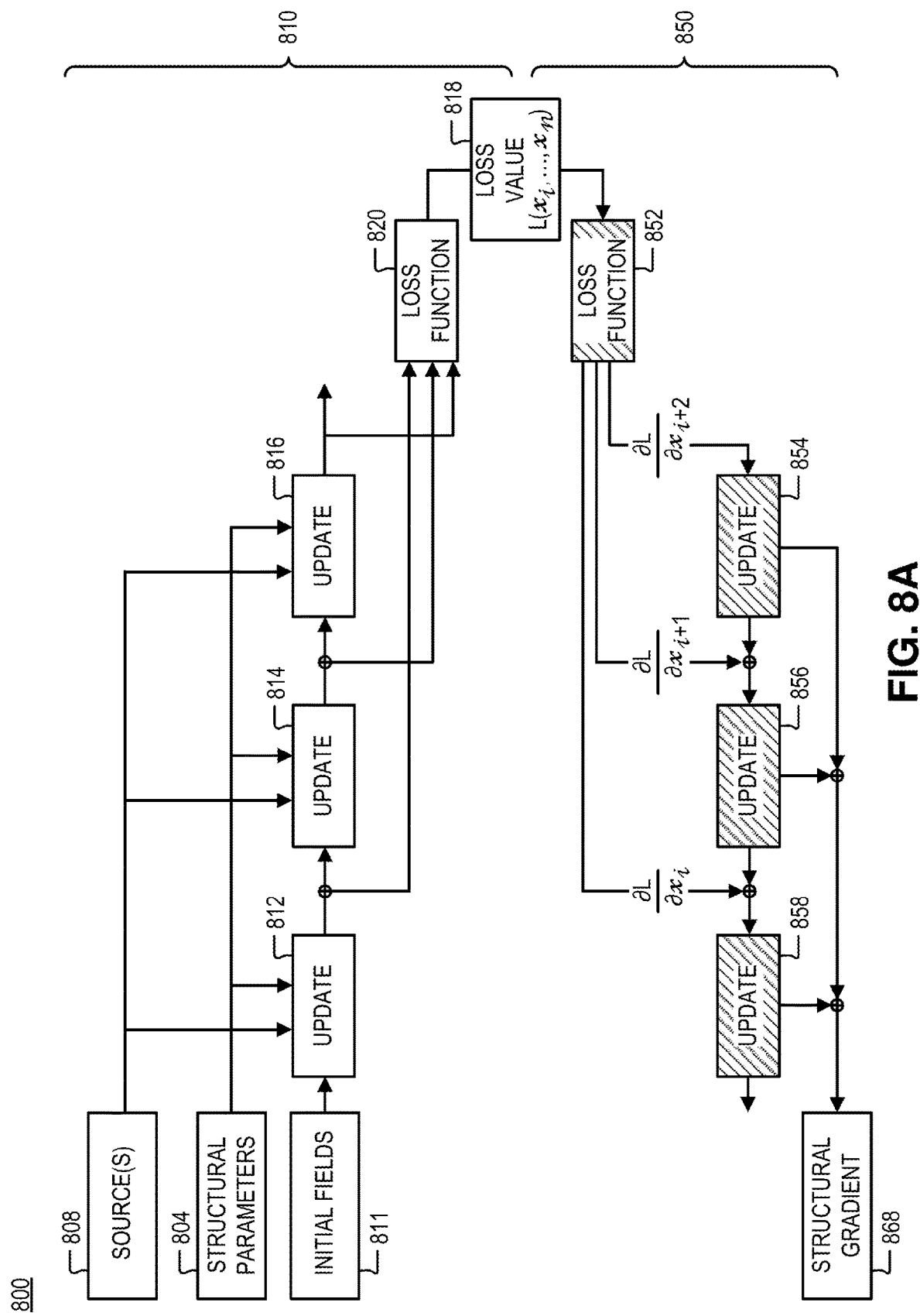
FIG. 8A is a flow chart illustrating example time steps for operational and adjoint simulations used to inverse design a PBS, in accordance with an embodiment of the disclosure.

FIG. 8A is a flow chart 800 illustrating example time steps for a time-forward simulation 810 and backpropagation 850 within a simulated environment, in accordance with an embodiment of the present disclosure. Flow chart 800 is one possible implementation that a design model may use to perform a forward operational simulation 810 and backpropagation 850 of a simulated environment. In the illustrated embodiment, the forward operational simulation utilizes a FDTD method to model the field response (both electric and magnetic) at a plurality of time steps in response to an excitation source. More specifically, the time-dependent Maxwell's equations (in partial differential form) are discretized to solve for field vector components (e.g. the field response of each of the plurality of voxels 710 of the simulated environment 701 in FIGS. 7A-7C) over a plurality of time steps.

As illustrated in FIG. 8A, the flow chart 800 includes update operations for a portion of operational simulation 810 and adjoint simulation 850. Operational simulation 810 occurs over a plurality of time-steps (e.g., from an initial time step to a final time step over a pre-determined or conditional number of time steps having a specified time step size) and models changes (e.g., from the initial field values 811) in electric and magnetic fields of a plurality of voxels describing the simulated environment and/or physical device that collectively correspond to the field response. More specifically, update operations (e.g., 812, 814, and 816) are iterative and based on the field response, structural parameters 804, and one or more physical stimuli sources 808. Each update operation is succeeded by another update operation, which are representative of successive steps forward in time within the plurality of time steps. For example, update operation 814 updates the field values 813 (see, e.g., FIG. 7B) based on the field response determined from the previous update operation 812, sources 808, and the structural parameters 804. Similarly, update operation 816 updates the field values (see, e.g., FIG. 8B) based on the field response determined from update operation 814. In other words, at each time step of the operational simulation the field values (and thus field response) are updated based on the previous field response and structural parameters of the physical device. Once the final time step of the operational simulation 810 is performed, the loss value 818 may be determined (e.g., based on a pre-determined loss function 820). The loss gradients determined from block 852 may be treated as adjoint or virtual sources (e.g., physical stimuli or excitation source originating at an output region) which are backpropagated in reverse (from the final time step incrementally through the plurality of time steps until reaching the initial time step) to determine structural gradient 868.

In the illustrated embodiment, the FDTD solve (e.g., time-forward simulation 810) and backpropagation 850 problem are described pictorially, from a high-level, using only "update" and "loss" operations as well as their corresponding gradient operations. The simulation is set up initially in which the structure parameters, the excitation source, and the initial field states of the simulated environment (and electromagnetic device) are provided. As discussed previously, the field states are updated in response to the excitation source based on the structural parameters. More specifically, the update operation is given by $\phi$, where $x_{i+1} = \phi(x_i, \beta_i, z)$ for $i = 1, \ldots n$. Here, n corresponds to the total number of time steps (e.g., the plurality of time steps) for the time-forward simulation, $x_i$ corresponds to the field response (the field value associated with the electric and magnetic fields of each of the plurality of voxels) of the simulated environment at time step $i$, $\beta_i$ corresponds to the excitation source(s) (the source value associated with the electric and magnetic fields for each of the plurality of voxels) of the simulated environment at time step $i$, and $z$ corresponds to the structural parameters describing the topology and/or material properties of the electromagnetic device.

It is noted that using the FDTD method, the update operation can specifically be stated as:

$$\phi(x_i, \beta_i, z) = A(z)x_i + B(z)\beta_i. \quad (1)$$

That is to say the FDTD update is linear with respect to the field and source terms. Concretely, $A(z) \in \mathbb{R}^{N \times N}$ and $B(z) \in \mathbb{R}^{N \times N}$ are linear operators which depend on the structure parameters, $z$, and act on the fields, $x_i$, and the sources, $\beta_i$, respectively. Here, it is assumed that $x_i, \beta_i \in \mathbb{R}^N$ where N is the number of FDTD field components in the time-forward simulation. Additionally, the loss operation is given by $L = (x_i, \ldots, x_n)$, which takes as input the computed fields and produces a single, real-valued scalar (e.g., the loss value) that can be reduced and/or minimized.

In terms of revising or otherwise optimizing the structural parameters of the electromagnetic device, the relevant quantity to produce is $\frac{dL}{dz}$, which is used to describe the change in the loss value with respect to a change in the structural parameters of the electromagnetic device and is denoted as the "structural gradient" illustrated in FIG. 8A.

Figure 8B:
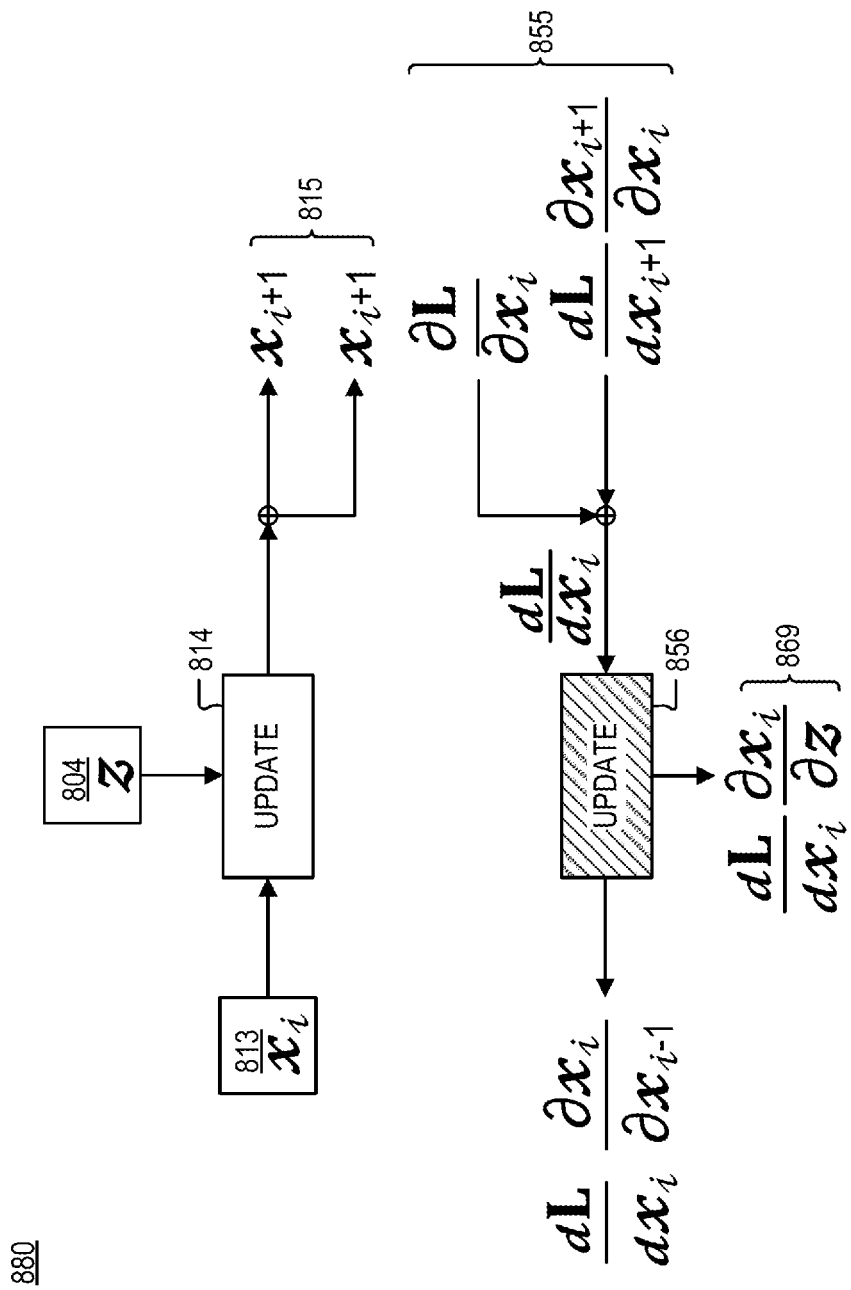
FIG. 8B is a flow chart illustrating a relationship between an operational simulation and the adjoint simulation (backpropagation), in accordance with an embodiment of the disclosure.

FIG. 8B is a chart 880 illustrating the relationship between the update operation for the operational simulation and the adjoint simulation (e.g., backpropagation), in accordance with an embodiment of the present disclosure. More specifically, FIG. 8B summarizes the operational and adjoint simulation relationships that are involved in computing the structural gradient, $\frac{dL}{dz}$, which include $$\frac{\partial L}{\partial x_i}, \frac{\partial x_{i+1}}{\partial x_i}, \frac{dL}{dx_i}, \text{ and } \frac{\partial x_i}{\partial z}.$$

The update operation 814 of the operational simulation updates the field values 813, $x_i$, of the plurality of voxels at the ith time step to the next time step (i.e., i+1 time step), which correspond to the field values 815, $x_{i+1}$. The gradients 855 are utilized to determine $$\frac{dL}{dx_i}$$

for the backpropagation (e.g., update operation 856 backwards in time), which combined with the gradients 869 are used, at least in part, to calculate the structural gradient, dL/dz, $$\frac{\partial L}{\partial x_i}$$

is the contribution of each field to the loss value, L. It is noted that this is the partial derivative, and therefore does not take into account the causal relationship of $x_i \rightarrow X_{i+1}$. Thus, $$\frac{\partial x_{i+1}}{\partial x_i}$$

is utilized which encompasses the $x_i \rightarrow X_{i+1}$ relationship. The loss gradient, $dL/dx_i$ may also be used to compute the structural gradient, $dL/dz$, and corresponds to the total derivative of the field with respect to loss value, L. The loss gradient, $$\frac{dL}{dx_i},$$

at a particular time step, i is equal to the summation of $$\frac{\partial L}{\partial x_{i+1}} + \frac{dL}{dx_{i+1}}\frac{\partial x_{i+1}}{\partial x_i}.$$

Finally, $$\frac{\partial x_i}{\partial z},$$

which corresponds to the field gradient, is used which is the contribution to dL/dz from each time/update step. dL/dz is given by:

$$\frac{dL}{dz} = \sum_i \frac{dL}{dx_i}\frac{\partial x_i}{\partial z}. \qquad (2)$$

For completeness, the full form of the first time in the sum, dL/dz, is expressed as:

$$\frac{dL}{dx_i} = \frac{\partial L}{\partial x_i} + \frac{dL}{dx_{i+1}}\frac{\partial x_{i+1}}{\partial x_i}. \qquad (3)$$

Based on the definition of $\phi$ as described by equation (1), it is noted that $$\frac{\partial x_{i+1}}{\partial x_i} = A(z),$$

which can be substituted in equation (3) to arrive at an adjoint update for backpropagation (e.g., the update operations such as update operation 856), which can be expressed as:

$$\frac{dL}{dx_i} = \frac{\partial L}{\partial x_i} + \frac{dL}{dx_{i+1}}A(z), \qquad (4)$$

or

-continued $$\nabla_{x_i} L = A(z)^T \nabla_{x_{i+1}} L + \frac{\partial L^T}{\partial x_i}. \qquad (5)$$

The adjoint update is the backpropagation of the loss gradients from later to earlier time steps and may be referred to as a backwards solve for $$\frac{dL}{dx_i}.$$

The second term in the sum of the structural gradient, $\frac{dL}{dz}$, is denoted as:

$$\frac{\partial x_i}{\partial z} = \frac{d\phi(x_{i-1}, \boldsymbol{\mathscr{b}}_{i-1}, z)}{dz} = \frac{dA(z)}{dz}x_{i-1} + \frac{dB(z)}{dz}\boldsymbol{\mathscr{b}}_{i-1}, \qquad (6)$$

for the particular form of $\phi$ described by equation (1).

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A polarization beam splitter, comprising:
    an input port adapted to receive guided optical signals that are polarization multiplexed, the guided optical signals including a transverse electric (TE) optical signal and a transverse magnetic (TM) optical signal;
    first and second output ports; and
    a polarization splitting region coupled between the input port and the first and second output ports, wherein the polarization splitting region includes a pattern of at least two materials having different refractive indexes, wherein the pattern is shaped to demultiplex the TE and TM optical signals by directing a first power majority of the TE optical signal received at the input port to the second output port via asymmetrical power splitting while directing a second power majority of the TM optical signal received at the input port to the first output port via multipath interferometry.

2. The polarization beam splitter of claim 1, wherein the at least two materials comprise silicon and silicon dioxide.

3. The polarization beam splitter of claim 1, wherein the input port comprises an interface between a single mode waveguide and the polarization splitting region and wherein the TE and TM optical signals are fundamental polarization modes TE0 and TM0, respectively, of the single mode waveguide.

4. The polarization beam splitter of claim 1, wherein the polarization splitting region comprises a planar waveguide having the pattern disposed within the planar waveguide as a two-dimensional pattern of the at least two materials.

5. The polarization beam splitter of claim 1, wherein the pattern comprises:
a first irregular shaped channel of a high index material surrounded by a low index material, the first irregular shaped channel extending between the input port and the second output port.

6. The polarization beam splitter of claim 5, wherein the first irregular shaped channel includes an S-bend shape that is not obstructed by the low index material.

7. The polarization beam splitter of claim 5, wherein the first irregular shaped channel forms a TE path from the input port to the second output port that is shaped to selectively guide the first power majority of the TE optical signal to the second output port.

8. The polarization beam splitter of claim 1, wherein the pattern is shaped to selectively guide the second power majority of the TM optical signal to the first output port via a plurality of TM paths extending from the input port to the first output port, the TM paths defined by a high index material surrounded by a low index material.

9. The polarization beam splitter of claim 8, wherein the plurality of TM paths include:
a primary TM path that includes a plurality of scattering locations formed from islands of the low index material dispersed within the high index material;
a secondary TM path through the high index material; and
a tertiary TM path through the high index material that is obstructed in at least one location by the low index material,
wherein the primary, secondary, and tertiary TM paths direct the second power majority of the TM optical signal received at the input port to the first output port via the multipath interferometry.

10. The polarization beam splitter of claim 1, wherein the pattern comprises an inverse designed pattern defined by an iterative minimization of a loss function that sums a transmission loss, a reflection loss, and a crosstalk loss.

11. A method of polarization dependent optical signal demultiplexing, the method comprising:
receiving a transverse electric (TE) optical signal and a transverse magnetic (TM) optical signal multiplexed on a common waveguide at an input port to a polarization splitting region, wherein the polarization splitting region includes a pattern of at least two materials having different refractive indexes;
directing a first power majority of the TM optical signal received at the input port to a first output port coupled to the polarization splitting region using multipath interferometry; and
directing a second power majority of the TE optical signal received at the input port to a second output port coupled to the polarization splitting region using asymmetrical power splitting,
wherein the pattern simultaneously induces the multipath interferometry and the asymmetrical power splitting on the TM and TE optical signals, respectively, when the input port is simultaneously excited by the TM and TE optical signals.

12. The method of claim 11, wherein the input port is disposed on a first side of the polarization splitting region, wherein the first and second output ports are disposed on a second side of the polarization splitting region opposite the first side, and wherein the first and second output ports are physically offset from each other along the second side.

13. The method of claim 11, wherein the pattern comprises an irregular pattern of the at least two materials.

14. The method of claim 13, wherein the polarization splitting region comprises a planar waveguide having the pattern disposed within the planar waveguide as a two-dimensional pattern of the at least two materials.

15. The method of claim 13, wherein the irregular pattern comprises:
a first irregular shaped channel of a high index material surrounded by a low index material, the first irregular shaped channel extending between the input port and the second output port.

16. The method of claim 15, wherein the first irregular shaped channel includes an S-bend shape that is not obstructed by the low index material.

17. The method of claim 15, wherein the first irregular shaped channel forms a TE path from the input port to the second output port that selectively guides the first power majority of the TE optical signal to the second output port.

18. The method of claim 11, wherein the pattern selectively guides the second power majority of the TM optical signal to the first output port via a plurality of TM paths extending from the input port to the first output port, the TM paths defined by a high index material surrounded by a low index material.

19. The method of claim 18, wherein the plurality of TM paths include:
a primary TM path that includes a plurality of scattering locations formed from islands of the low index material dispersed within the high index material;
a secondary TM path through the high index material; and
a tertiary TM path through the high index material that is obstructed in at least one location by the low index material,
wherein the primary, secondary, and tertiary TM paths direct the second power majority of the TM optical signal received at the input port to the first output port via the multipath interferometry.

20. The method of claim 11, wherein the pattern comprises an inverse designed pattern defined by an iterative minimization of a loss function that sums a transmission loss, a reflection loss, and a crosstalk loss.

* * * * *